(12) United States Patent
Wood (10) Patent No.: US 8,185,131 B2
(45) Date of Patent: May 22, 2012

(54) METHOD OF PROVIDING LOCATION-BASED INFORMATION FROM PORTABLE DEVICES

(76) Inventor: Jeremy Wood, New York, NY (US)

( * ) Notice: Subject to any disclaimer, the term of this patent is extended or adjusted under 35 U.S.C. 154(b) by 137 days.

(21) Appl. No.: 12/733,975

(22) PCT Filed: Sep. 10, 2008

(86) PCT No.: PCT/US2008/010541
§ 371 (c)(1),
(2), (4) Date: Apr. 1, 2010

(87) PCT Pub. No.: WO2009/045262
PCT Pub. Date: Apr. 9, 2009

(65) Prior Publication Data
US 2010/0234046 A1      Sep. 16, 2010

Related U.S. Application Data

(60) Provisional application No. 60/976,856, filed on Oct. 2, 2007.

(51) Int. Cl.
*H04W 24/00* (2009.01)
(52) U.S. Cl. ............... 455/456.1; 455/456.3; 455/456.6
(58) Field of Classification Search ............... 455/456.1, 455/456.3, 456.6, 422.1, 566, 432.3, 414.1, 455/414.2, 404.2; 705/5, 10, 14; 709/205, 709/223
See application file for complete search history.

(56) References Cited

U.S. PATENT DOCUMENTS

| 6,098,048 | A | 8/2000 | Dashefsky et al. |
| 6,505,048 | B1 | 1/2003 | Moles et al. |
| 6,675,017 | B1 | 1/2004 | Zellner et al. |
| 6,716,101 | B1 | 4/2004 | Meadows et al. |
| 6,775,613 | B2 * | 8/2004 | Burt et al. ...................... 701/408 |
| 6,799,049 | B1 | 9/2004 | Zellner et al. |
| 6,810,323 | B1 * | 10/2004 | Bullock et al. ................ 701/467 |
| 6,823,190 | B2 | 11/2004 | Ford et al. |
| 6,842,620 | B2 | 1/2005 | Smith et al. |
| 7,062,279 | B2 | 6/2006 | Cedervall et al. |
| 7,224,978 | B2 | 5/2007 | Zellner et al. |
| 7,245,925 | B2 | 7/2007 | Zellner |
| 7,503,074 | B2 * | 3/2009 | Dublish et al. .................. 726/27 |
| 7,848,765 | B2 * | 12/2010 | Phillips et al. ............. 455/456.3 |
| 2002/0010629 | A1 | 1/2002 | Diamond |

(Continued)

FOREIGN PATENT DOCUMENTS

DE      10337054      3/2005

(Continued)

*Primary Examiner* — Jean Gelin
(74) *Attorney, Agent, or Firm* — Richard C. Litman (57) ABSTRACT

The method of providing location-based information from portable devices allows for the tracking of the location of portable devices (14), such as cellular telephones, for example, for the recordation and subsequent analysis of demographic, location-based information. The method includes the steps of: determining (200) a geographic location of at least one portable device (14); recording geographic location coordinates (250) of the portable device (14) in computer readable memory (140); establishing a set of public geographic regions (20) and a set of non-public geographic regions (30) within a geographic area in which the portable device (14) is located; and dividing each non-public geographic region (30) into a plurality of geographic non-public zones (52), where if the portable device (14) is located within a non-public geographic region (30), the geographic location coordinates are replaced (260) with a generalized set of geographic coordinates associated with the non-public geographical region (30).

17 Claims, 4 Drawing Sheets

U.S. PATENT DOCUMENTS

| | | |
|---|---|---|
| 2002/0111172 A1 | 8/2002 | DeWolf et al. |
| 2002/0174073 A1 | 11/2002 | Nordman et al. |
| 2003/0134648 A1 | 7/2003 | Reed et al. |
| 2003/0171975 A1 | 9/2003 | Kirshenbaum et al. |
| 2004/0093289 A1 | 5/2004 | Bodin |
| 2004/0192252 A1* | 9/2004 | Aerrabotu et al. ......... 455/404.1 |
| 2004/0203900 A1 | 10/2004 | Cedervall et al. |
| 2006/0009194 A1 | 1/2006 | Ross |
| 2006/0105795 A1 | 5/2006 | Cermak et al. |
| 2006/0111961 A1 | 5/2006 | McQuivey |
| 2006/0165100 A1* | 7/2006 | Huang et al. ................. 370/400 |
| 2006/0189328 A1 | 8/2006 | Cedervall et al. |
| 2006/0246920 A1 | 11/2006 | Shim |
| 2006/0294225 A1 | 12/2006 | Grecco et al. |
| 2007/0143348 A1 | 6/2007 | Rosenberg |
| 2007/0264974 A1 | 11/2007 | Frank et al. |
| 2007/0270163 A1 | 11/2007 | Anupam et al. |
| 2007/0271367 A1* | 11/2007 | Yardeni et al. ................. 709/223 |
| 2008/0133336 A1* | 6/2008 | Altman et al. .................. 705/10 |
| 2009/0047972 A1* | 2/2009 | Neeraj ....................... 455/456.1 |

FOREIGN PATENT DOCUMENTS

| | | |
|---|---|---|
| KR | 10-0623629 | 9/2006 |
| WO | WO 02/07474 | 1/2002 |

\* cited by examiner

METHOD OF PROVIDING LOCATION-BASED INFORMATION FROM PORTABLE DEVICES

CROSS REFERENCE TO RELATED APPLICATIONS

This application is a 371 of PCT/US2008/010541, filed Sep. 10, 2008, which claims the benefit of Provisional Patent Application No. 60/976,856, filed Oct. 2, 2007.

TECHNICAL FIELD

The present invention relates to the acquisition and analysis of location-based tracking information from portable devices, such as cellular telephones. Particularly, the present method includes the selective replacement of actual location data of the portable devices with generalized location coordinates in order to maintain the privacy of the portable device users.

BACKGROUND ART

Cellular telephone carriers in the United States and Europe are required by law to be able to locate a given telephone, in the event that telephone calls for emergency services (such as by calling "911" in the United States) are placed. To this end, cellular telephones typically employ Assisted Global Positioning System (aGPS) transceivers, which is an enhanced version of the GPS systems which calculate the position of a device using data gathered from satellites orbiting the Earth.

The output from aGPS and GPS is a set of location coordinates; i.e., a pair of numbers identifying the approximate longitude and latitude of the device. Potentially, the information related to the location of a cellular telephone or other GPS-enabled device could be used for purposes other than providing emergency services. For example, the device could alert the user when a particular store, or any person on a predetermined "buddy" list, is within a predetermined distance. In fact, an entire industry is presently developing, for the purpose of providing Location Based Services (LBS) such as these. This industry is projected to grow rapidly.

The above-described emerging industry must deal with concerns regarding privacy of the device users. Many persons are understandably concerned about the existence of detailed records of the movement of their cellular telephones (and, thus, the persons themselves). For this reason, many cellular telephone carriers have adopted detailed policies to address these privacy concerns. For example, the privacy policy of Verizon Wireless® is to not retain this personally identifiable position data any longer than necessary for technical service purposes.

However, as more and more people carry cellular telephones (and similar devices) with them, information about the movements of these devices can be a useful proxy for the movements of people generally. Thus, for example, a statistically valid sample of the tracks of a small percentage of the cellular telephones in a metropolitan area could provide a precise, graphic illustration of the flow of humanity during rush hour.

It would be desirable to be able to provide a tracking system, for demographic and other purposes, which could follow the movements of cellular or other portable devices, but which will not compromise the privacy of the users of these devices. For example, a complete log of a cellular telephone's movements would show the location of the owner's home. Such information would compromise the owner's identity and privacy. However, if the location information in the log were sufficiently vague about the location of the device when it leaves a public space (e.g., a train station or street) and moves into a residential neighborhood or office, then privacy could be protected. Thus, a method of providing location-based information without compromising a user's privacy solving the aforementioned problems is desired.

DISCLOSURE OF THE INVENTION

The method of providing location-based information from portable devices allows for the tracking of the location of portable devices, such as cellular telephones, for example, for the recordation and subsequent analysis of demographic, location-based information. The method includes the steps of:

1) determining a geographic location of at least one portable device;
2) recording geographic location coordinates of the at least one portable device in computer readable memory;
3) establishing a set of public geographic regions and a set of non-public geographic regions within a geographic area in which the at least one portable device is located; and
4) dividing each non-public geographic region into a plurality of geographic non-public zones, wherein if the at least one portable device is located within a non-public geographic region, the geographic location coordinates associated with the at least one portable device are replaced with a generalized set of geographic coordinates associated with the non-public geographical region, and if the at least one portable device is located within a public geographic region, the geographic location coordinates associated with the at least one portable device remain unchanged.

In the above, geographic location coordinates associated with the at least one portable device are replaced with the generalized set of geographic coordinates associated with the non-public geographical region, which includes replacing the geographic location coordinates associated with the at least one portable device with location coordinates of the geographic non-public zone in which the at least one portable device is located. The location coordinates of the geographic non-public zone may be, for example, a centroid of the geographic non-public zone when viewed in a two-dimensional representation. Alternative methods of determining the modified coordinates are also provided below.

These and other features of the present invention will become readily apparent upon further review of the following specification and drawings.

BEST MODES FOR CARRYING OUT THE INVENTION

The present invention includes a method which obtains demographic data from a plurality of cellular devices (or any other suitable portable devices capable of transmitting location-based data). As will be described in greater detail below, the method further includes the creation of modified data set from which potentially sensitive information has been removed. Thus, the present inventive method includes both the construction of an initial data set containing information about locations of various devices, and the modification of the data set so as to preserve the privacy of users. In the following, the term "cellular device" includes cellular telephones, and any other suitable portable devices which are capable of transmitting and/or storing location information.

As will be described below, the present inventive method provides a tracking system, for demographic and other purposes, which follows the movements of cellular or other portable devices, but which does not compromise the privacy of the users of these devices. For example, a complete log of a cellular telephone's movements would show the location of the owner's home. Such information would compromise the owner's identity and privacy. However, if the location information in the log were sufficiently vague about the location of the device when it leaves a public space (e.g., a train station or street) and moves into a residential neighborhood or office, then privacy could be protected. The present method allows for the determination of location when, for example, the device leaves the public space and rendering the non-public location sufficiently vague so as to make it impossible to identify the user of the device. At no time does the data set include any information on the name, address, social security number, etc. of the user of the cellular telephone or other device.

Figure 1:
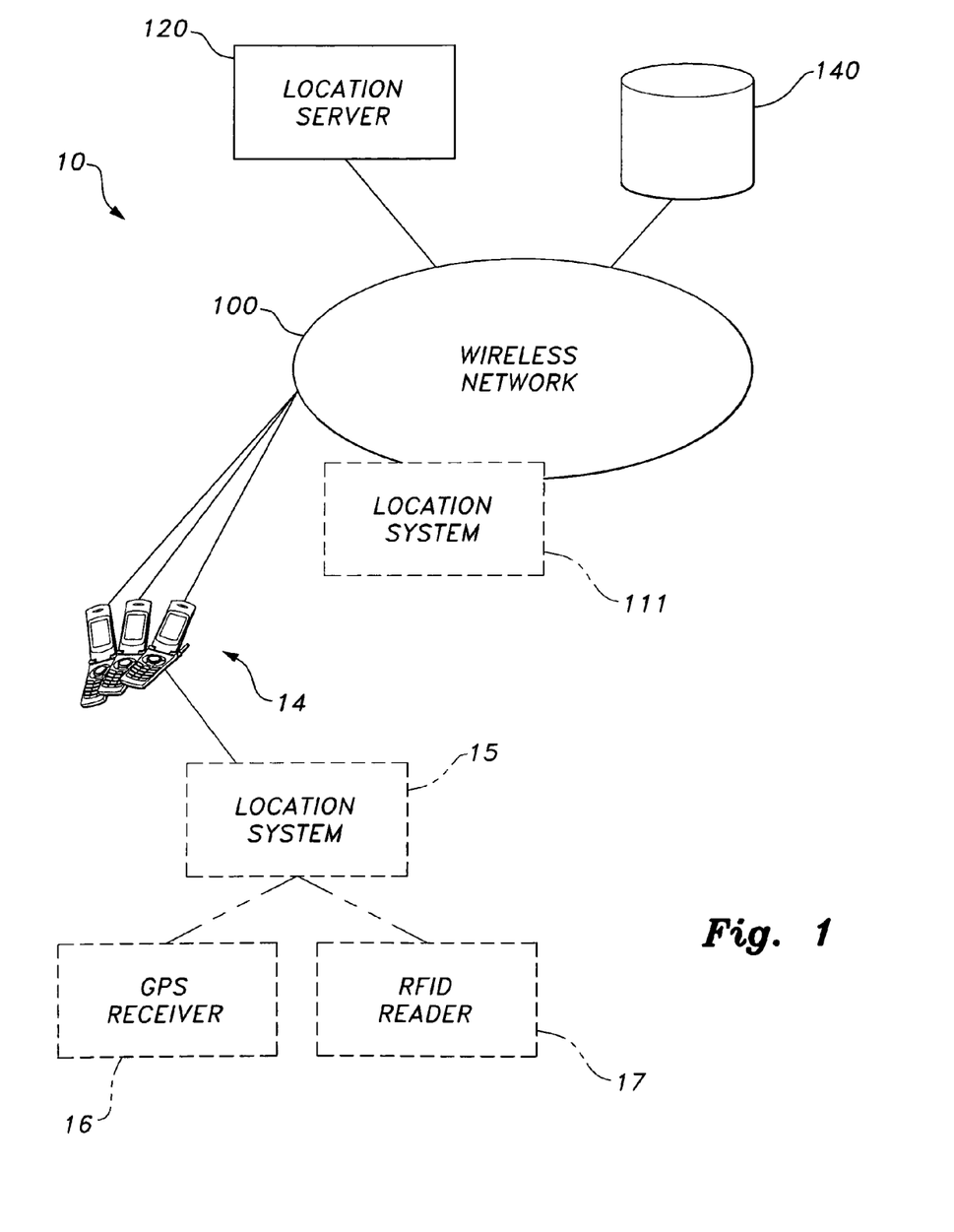
FIG. 1 is a diagrammatic view of a system for implementing the method of providing location-based information from portable devices.

The data obtained from the cellular or other portable devices 14 include position-based data including, for example, the device's latitude and longitude, or an equivalent measure of the user's position, and a corresponding date and time. In FIG. 1, the overall telecommunication and location system 10 includes a plurality of exemplary cellular telephones 14 or other cellular or portable devices. Each exemplary cellular telephone 14 is equipped with a location-tracking system 15, which may take the form of a global positioning satellite (GPS) transceiver 16, a radio frequency ID tag (RFID) reader/transmitter 17 or the like. Telephones 14 are linked to a wide area wireless network 100, which may be a conventional cellular telephone network, for example. Wireless network 100 includes a location tracking sub-system 111.

Figure 2:
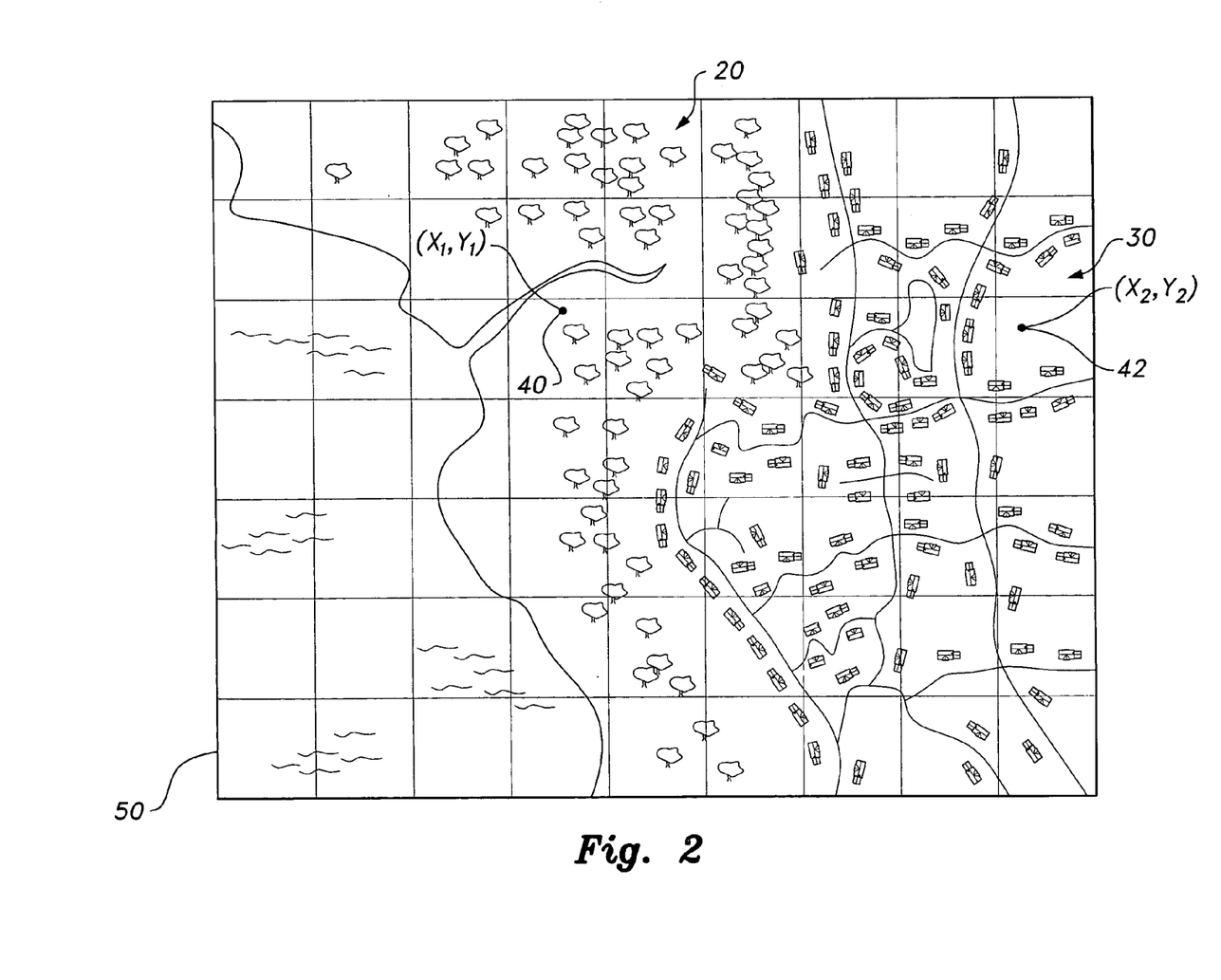
FIG. 2 is a diagrammatic view of a virtual map, illustrating location-based steps of the method of providing location-based information from portable devices according to the present invention.
Figure 3:
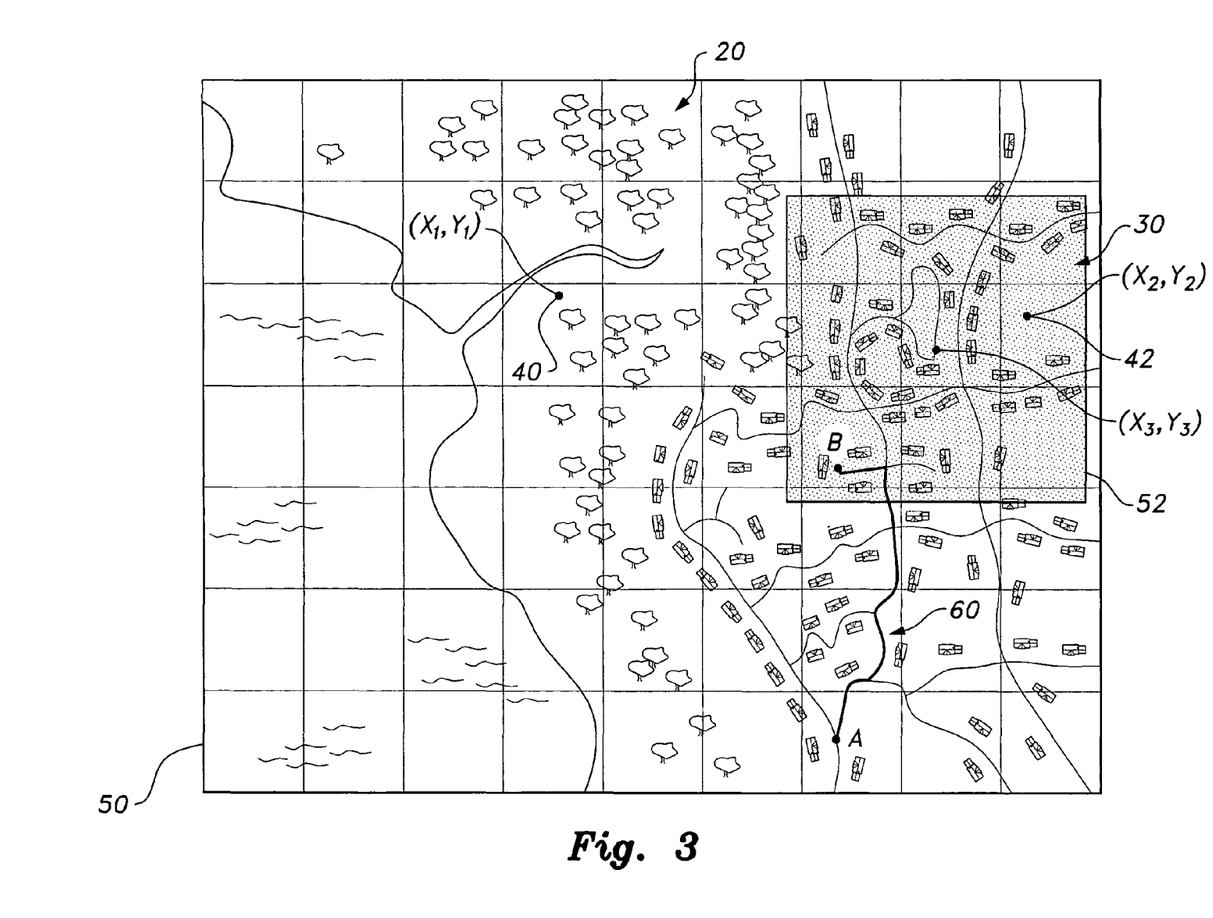
FIG. 3 is a diagrammatic view of a virtual map, illustrating further location-based steps of the method of providing location-based information from portable devices according to the present invention.

The location data, obtained from devices 14, are interpreted with respect to available information about the geographic area being studied via a location server 120 with associated computer data storage 140. FIG. 2 illustrates a sample virtual map of the type which may be generated by location server 120 and stored in memory 140. For the sake of simplicity, only two devices 40, 42 are shown in FIG. 2. Each device 40, 42 transmits location information through wireless network 100, with the location of device 40 being shown as an exemplary pair of Cartesian coordinates $(X_1, Y_1)$, and the location of device 42 being shown with a similar set of location-based Cartesian coordinates $(X_2, Y_2)$. The Cartesian coordinates represent a generalized location-based coordinate system, and any suitable location coordinates may be utilized. The visual, graphical representations of FIGS. 2 and 3 are shown for exemplary purposes only, and may be displayed on any suitable display device associated with server 120 or any other computer system which is linked to server 120.

In use, each location-based point in the data set obtained from the cellular devices is plotted on exemplary virtual map 50. Preferably, storage 140 contains virtual maps for the entire geographic region covered by wireless network 100, which holds a geographic database containing known information about the region being studied. Location server 120 then accesses these virtual maps and plots the locations of the devices contained within the geographic regions of interest. By locating a given set of coordinates with respect to the geographic database, the system determines whether a given point is in a public area or a non-public area. In the exemplary region shown in map 50 of FIG. 2, the area contains a public area, composed of park land or the like (region 20), and a second region containing businesses and residences (region 30). Region 20 represents a public area and region 30 represents a non-public area, as will be described in greater detail below. Each sub-region of each virtual map stored in memory 140 is classified as a public region or a non-public region.

If the location point of interest is in a public area, this point may be retained and used without compromising the privacy of the user of the cellular device; i.e., in the example of FIG. 2, device 40 is in public area 20, thus the location coordinates $(X_1, Y_1)$ may be stored in memory 140 and used for demographic analysis. However, if the point of interest is in a non-public area, the point is replaced with a symbolic point which does not reveal exact, private information about the user's location. For example, the data point can be replaced with the centroid of the surrounding census tract or other large area, so that the point conveys no non-public information about the location of the user. In FIG. 3, device 42 is located in a non-public region 30. The user may be, for example, in his or her home. Region 30 is deemed "non-public" so as not to reveal the user's home address to outside analysts of the demographic information to be gained from the present method. In the non-public region 30, the exact location of device 42 is replaced by a generalized location, given as the center of the exemplary rectangular zone 52, thus replacing the user's precise location coordinates with a new set of coordinates $(X_3, Y_3)$, which only indicate the user's general vicinity, rather than an exact location. As will be described in greater detail below, the conditions distinguishing between a non-public region and a public region may be variable, and are user-selectable. The location server 120 can be programmed to deal with various types of non-public locations in differing ways.

Figure 4:
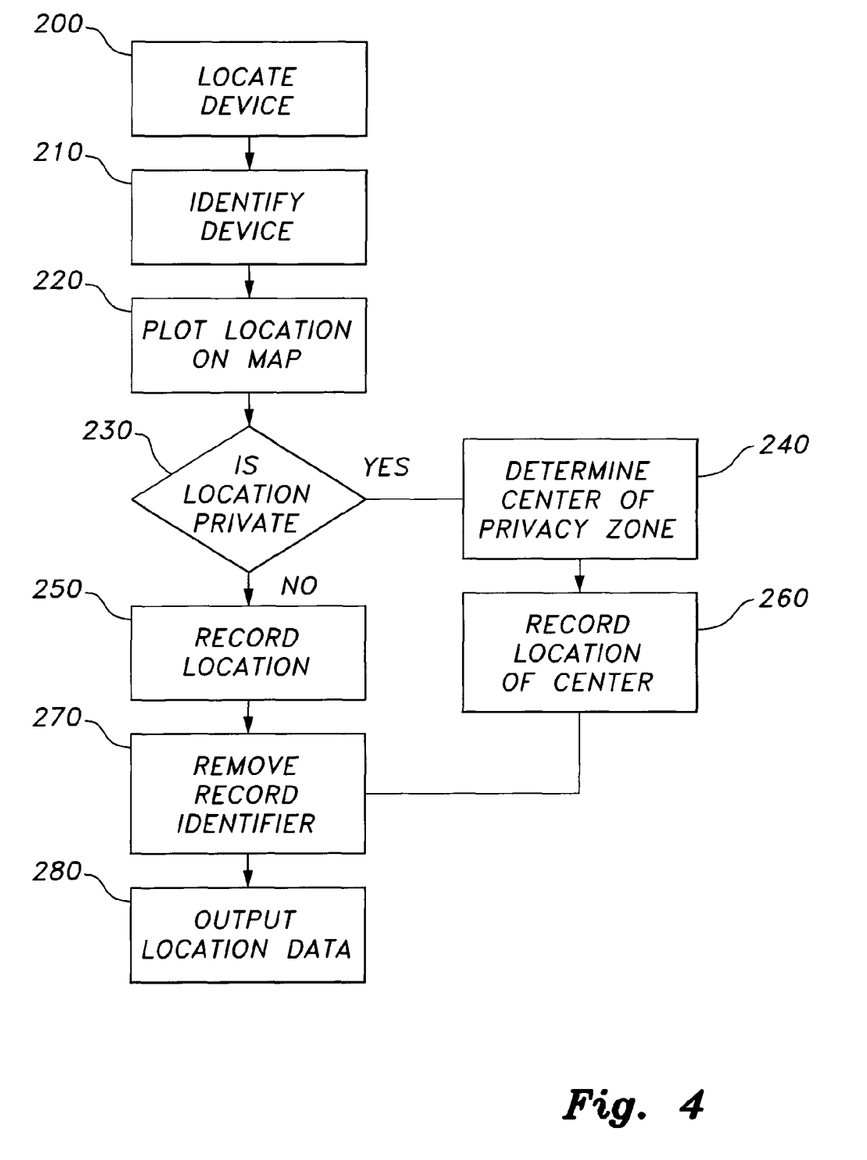
FIG. 4 is a flow diagram illustrating the steps of the method of providing location-based information from portable devices according to the present invention.

In use, the system 10 assembles a data set from a plurality of cellular devices, with each entry in the data set preferably including at least a pair of location coordinates and an associated time. In FIG. 4, the location of each individual device is shown as step 200. The data set is then modified to produce an output data set in which none of the entries identifies with particularity the location whose data were taken if the users are within a non-public region.

In order to track the movements of a particular device, the system 10 must be able to group together the data from each device. Thus, the system relies on a record identifier, which is a data item unique to a particular device, and which is transmitted along with the coordinates and time. Cellular telephones, for example, conventionally transmit a record identifier known as an electronic serial number (ESN), which cellular carriers use to identify a particular telephone. The ESN is not the same as the telephone number for that device, and does not encode non-public information about the user therein. In FIG. 4, the record identifier is used to identify the device at step 210. As described above, each device's location is plotted on virtual map 50 at step 220, and a determination is made as to whether the device is in a non-public region or a public region (step 230). If the device is in a public region, where user non-public is not at issue, the location of the device is recorded at 250. If the device is in a non-public region, the center of the non-public zone (or another geographic identifier for the broad non-public zone) is determined at step 240, and this location is recorded instead of the exact location coordinates at step 260.

Although the ESN does not reveal non-public information about users, to enhance privacy further, the system 10 is preferably programmed to delete the record identifiers, or replace them with random numbers, after the data from particular telephones have been collated, and the record identifiers are no longer needed. This is shown at step 270. If the device does not transmit a record identifier, then the system can still be used to provide information on the locations, in the aggregate, of various devices at various times, but it will not provide information on the movements of specific devices.

The record identifier may be handled in a variable manner, dependent upon whether the data are acquired in real time or in a batch form. If the data are transmitted from the various devices in real time (i.e., data from different devices arrive at location server 120 at approximately the same time) then a record identifier is necessary if it is desired to track the movements of particular devices. However, if all of the data from a given device are transmitted to the system in one batch, then no such record identifier would be necessary.

In general, for the preferred embodiment, the output data (at step 280) has essentially the same form as the input data, namely latitude, longitude, date and time, and, if available, a record identifier. The product data set may then be used in various ways, as will be described in greater detail below, without invading the privacy of any of the users of the cellular devices. In the alternative embodiment described below, in which a population density map is utilized, the modified coordinates are also provided with a range of error about those coordinates.

As noted above, the present inventive method includes the processing of data taken from a sample of portable devices. Such data preferably do not include location data taken every second, because sampling over such a small time interval would result in an unwieldy volume of data. Rather, the location of each device is collected periodically at a user-selectable time interval. The location of a device during each sampling period is preferably sampled at predetermined intervals which are set by the user and input to the location server 120. Both the sampling time interval and the number of devices sampled are selected for the particular statistical project.

With regard to sampling, a "rolling sample" may be utilized. In this embodiment, for a given metropolitan area, data may be collected every day for 20 days, for example. Thus, the collected dataset will include data from every day of the week, including a variety of weather conditions, traffic conditions and the like. The rolling sample allows the size of each day's sample to remain manageable, which is important because cellular carriers typically lack the ability to track all devices in their network at one time.

The sample period for each individual is preferably relatively short to limit the risk that a track will string together a large number of improbable events (e.g., unusual destinations) that the track can be confidently linked to the particular user of the device. As an alternative to using a 24 hour sampling, in order to protect the user's privacy, a shorter period may be used. This shorter period preferably includes the location of the device overnight (or when the person turned it on in the early hours of the morning). If the device cannot be tracked for 24 hours, it remains desirable to sample the overnight period for each device tracked. Thus, as an alternative sampling time, the sample may be staggered over 13 hour sample periods. For example, for all of the devices in a given day's sample, location data is collected from 1:00 to 3:00 A.M. so that a demographic profile can be probabilistically assigned to the device, based on the neighborhood in which the device spends the night. For half of the devices in a given day's sample, location data may further be collected for the 11 hours before this "night" period. For the other half of the devices, location data is collected for the 11 hour period following this "night" period.

With regard to the devices 14, the devices being tracked are preferably selected from a relatively large population. The sampling of the devices 14 does not need to be purely random. In order to assure that the sample includes a useful number of devices from, for example, each town in a metropolitan area being sampled, standard multi-stage sampling methods may be employed. However, in order to minimize the chances of a third party being able to identify an individual carrying a particular device 14, the actual selection of the devices 14 preferably does not follow a readily-discoverable rule (i.e., the selection of which devices are being sampled should not be based on a simple pattern, such as all the devices carried by users living on the same street) and, further, a relatively large number of devices from an eligible pool of devices should remain unsampled.

Further, data from a given device is preferably only collected for a predetermined, relatively short period of time (e.g., 24 hours or less, as described above), because the longer one follows a given device, the more distinctive the profile of its movements becomes, thus removing a level of anonymity of the device.

Additionally, in order to maintain substantially random statistics, a given device is preferably included in the sample no more than once for a given demographic analysis. As noted above, the location of the device is preferably sampled at regular intervals during the sample period. Sampling may be more frequent where a series of location readings indicates that the device is in motion in public, because data on movements may be particularly valuable for demographic purposes, and because data concerning public movements are unlikely to pose privacy problems.

Data from each portable device are collected and stored in memory 140 in a series of data sets, with each data set being used for a particular demographic analysis. Each data set includes a user-selectable, finite number of records, and each record or entry within a particular data set includes the data from a given device, gathered at prescribed intervals over that device's sample period. The data from a given device includes a number of data points, with each data point preferably including location coordinates, which may be a latitude and longitude, for example, or any other suitable method of providing geographic location, and which further preferably include the date and time at which the location readings were taken. The data points may further include a unique record identifier, which identifies a particular device, but which does not reveal non-public information about the user, such as the cellular ESN described above.

If the device transmits a record identifier, then the data points from a given device, taken together, form a "track" (i.e., a path of location coordinates) which, without the time data, can be graphically represented on a map, such as the map illustrated in FIGS. 2 and 3. This track can be constructed as a graphical representation, or simply be stored as a set of data points in memory 140. In FIG. 3, an exemplary track 60 is illustrated, beginning at a starting point A, and terminating at an ending point B, with a series of polled locations, each taken at a selected time interval, shown between. It should be reiterated that the data set contains no other potentially identifiable data on the device, its use, or its owner or user. As shown in FIGS. 2 and 3, the end user (i.e., the person or persons analyzing the data for demographic purposes) only receives location data in the visual display, with no other information being displayed. Although a record identifier may be recorded, this is only temporary and at step 270 (see FIG. 4), the record identifier is deleted, prior to display of the tracking information.

With regard to the data obtained in implementing the above method, the data processing is a computer implemented database operation, with location server 120 being any suitable type of programmable logic controller or computer, and with storage memory 140 being any suitable type of readable and writable computer storage memory, including both volatile and non-volatile memory. The data processing preferably occurs in real time (i.e., the location readings are obtained and forwarded the location server 120 at the time of sampling, rather than being processed at a later time, as a batch) in order to ensure privacy protection of the device users.

The first round of processing is based upon whether the device being sampled is located in a public or non-public region. Preferably, a street network geographical database with census and zip code layers, as well as large area landmarks and local points of interest is used and stored within memory 140. Essentially, the database stored within memory 140 is a detailed, street level map (with zip code areas and census units available as an overlay) with each geographic area of interest being represented in the database with codes indicating the nature of each feature present, and the locations of each, represented by location coordinates.

The location coordinates from each device is plotted on the virtual computer map, using any suitable plotting technique. Such processes are well known in the art, and are typically referred to as "reverse geocoding". Where the reverse geocoding indicates that the device being sampled is located within a large area landmark or other public area (e.g., a stadium, park, shopping mall, train station or the like) or a transportation corridor (e.g. on train tracks, a highway or the like) the system 10 determines the device to be in a public location (steps 230, 250), and the coordinates are provisionally retained in an unaltered format. However, where the reverse geocoding indicates the location is a local point of interest (e.g., a hotel, restaurant, parking lot, store, house, business or the like), these data are preferably retained (i.e., stored for analysis in memory), although, as will be described in greater detail below, may be selectively "blurred" or modified (using the process described above) by establishing a large non-public zone 52 about the user's true location, and only identifying the location of this larger zone. As will be described in greater detail below, with regard to the alternative embodiment, a point within the non-public space may also be identified with a given radius about that point also being identified, thus allowing for the modified point to be located within a given region, defined by this radius. This is dependent upon the user's particularly sensitivity to privacy concerns. Preferably, the blurring process is automatic, thus protecting the users' privacy automatically, without requiring additional work from the users. Further, such an automatic system removes the possibility of user error. However, in an alternative, less preferred embodiment, the users may be able to vary the degree of privacy needed; i.e., a user may choose to have his or her true location displayed to third party end users, rather than establishing locations of a non-public zone, or the user may choose to utilize the anonymity of the non-public zone. When privacy is selected, the coordinates of the non-public zone 52 may be given as the zone's center or centroid, or any other suitable generalized location.

Additionally, time coordinates may also be analyzed to determine how long a particular device has been in a particular public location. This information may be important for some demographic analyses. However, the presence of a device at a specific location for an extended period may compromise the identity of the user of the device, even if the location is public (e.g., it might indicate that the user of the device works at the public location). The user may select to "blur" his or her location, as if in a non-public zone, if the device is in a public place for an extended period of time, replacing the user's true location (even though the user is in a public region) with a modified location, such as that provided by non-public zone 52. Preferably, this process is automated, without the user being required to input privacy settings.

Additionally, some users may have jobs which require them to travel through varying public and non-public regions throughout the day, such as delivery persons. These users may select privacy settings, allowing them to mask their specific routes, but still allow for tracking when they are off duty and, for example, simply shopping. One exemplary method of "blurring" the path of a delivery person or the like is to retain coordinates of most of the route, or generalized, "blurred" coordinates of the route, but removing the starting and/or ending points of the route (points A and B in the example of FIG. 3).

For added privacy protection, the paths of relatively unusual travels may also be obscured. For example, a trip following public roads from a residential area to an urban area during typical morning rush hour would not be deemed an unusual travel path. However, travel from the same residential area at midnight to a hotel 50 miles away would be deemed "unusual" (with the levels of "unusual" travel being user-selectable and being input to server 120), and the exact coordinates of this travel path may be "blurred" or modified to protect the device user's privacy.

An example of use of the present system and method is the development of a demographic profile of persons visiting a given shopping mall or attending a given sports event. End users may assume that, in most cases, the census area in which a given device begins its travel route on a particular day (i.e., where it started moving after not moving from midnight until 6:00 A.M., for example) represents the census area in which its owner resides. Using this assumption, one can draw on a large volume of existing data profiling the residents of that area. The end user may be able to further refine this analysis by examining other stops made by the person carrying the device on the same day. For example, one might use the fact that the device spent three hours at a public high school before and after a lunchtime trip to the mall to infer that the carrier of the device is a teenager. Obviously, in any particular instance, the above assumptions may prove to be false but, as inferential tools with a large sample, such assumptions can nonetheless lead to useful conclusions, especially if one considers the likely sources of error and their effects on the conclusions drawn.

This type of profiling is potentially less expensive and more accurate than the conventional alternatives (e.g. trying to interview individuals in a shopping mall), especially where members of the population of interest (e.g., the youth market) are often known to refuse such interview requests. The method may be used to help retailers evaluate possible future store locations. There already exists a significant industry devoted to helping retailers with site selection. The inventive method will provide this industry with very valuable data on the demographic profile of those visiting a given shopping mall or those who are driving down a given thoroughfare. Additionally, the method may be used to help advertisers identify the demographic profile of those traveling past a given outdoor sign or marquee. Further, method may be used in the planning and optimizing of regional transportation systems, through analysis of the tracks of a statistically valid sample of persons within a given region as such persons go about their daily travels.

The above embodiment uses anonymity to protect privacy of the users; i.e., when a user is in a crowded public place, revealing his or her location does not compromise privacy because the presence of a crowd means that the location information does not identify him or her. However, when the location information indicates that the device may not be in a public area, the user's location is rendered vague. It, thus, becomes important to establish how vague an area must be established. If the given coordinates are in midtown Manhattan, for example, then producing a modified set of coordinates within 0.5 miles of the user's true location, for example, provides a greater level of anonymization than is needed. The system is being far more vague than is necessary, thus compromising the precision of the data unnecessarily.

Similarly, if the coordinates are in a rural area, then producing a range of within 0.5 miles does not provide sufficient anonymization for the user(s). As an alternative to protect against the over or under-anonymization described above, a guide to the density of a population is established in order to blur locations enough to provide anonymization, but not so much that the precision of the data is compromised unnecessarily.

For residential areas in the United States, the census provides excellent information on population density. Thus, if it is determined that a crowd of 4,000 people, for example, is needed to provide sufficient anonymization, then the system can blur to the census unit that contains the homes of at least 4,000 people. However, many countries do not have a census with this level of accuracy or detail. Further, even where a census is available, the census reveals where people live, not where they work. So, for example, the census might indicate that no one lives on a given block in mid-town Manhattan where there is a single, office complex. However, in reality, that one block area is typically sufficiently crowded so as to provide sufficient anonymization all by itself.

Thus, in this embodiment, a density map is established, with the density map revealing the approximate number of people within a given area. Multiple density maps are preferably generated for a given region, reflecting the densities at various times of the day, various days of the week, etc., or for special events.

The density map is generated by taking a "snapshot" (i.e., a sampling of population at a given time) of the locations of a sample of devices to protect the privacy of those in non-public locations. To protect non-public, these snapshots contain no information (besides location) of the devices depicted. The devices taken in the snapshot for the generation of the density map are not tracked over time, thus identification of the devices is not necessary at this stage. From the outset, the snapshot is completely free of non-location information.

Owing to cellular network capacity limits, it may not be possible to record at one time the location of all of the devices which it is desirable to include in the snapshot. Accordingly, it may be necessary to assemble each snapshot using data collected from different devices within the same limited time period (for example, one hour). Assembling a snapshot in this manner would require knowing which devices had been sampled during, for example, the first part of the sampling period. However, the record of the locations would not contain information on which device a given recording came from.

Owing to random variations in the distribution of devices, it is preferable to use multiple snapshots to assemble the density map. Assembling such a density map involves adding the data points from multiple snapshots to a single map. It should be noted that when using a density map assembled in this fashion, one would have to take into account the fact that the data reflected reflects the sum of the number of devices from multiple snapshots.

Once the density map is obtained, it can be used to blur locations. Assuming that a given city has 5,000,000 people, and the density map contains data on 5,000 devices. In this scenario, each point in the density map would represent 1,000 people. If the system determines that a crowd of 4,000 people is necessary to achieve anonymity, then it is necessary to blur an area that contains an average of four cellular telephones.

Thus, the system defines a circle, for example, large enough to contain an average of four cellular telephones at any one time around the location to be blurred. If the density map for a given time is assembled from ten such snapshots, then one would define a circle large enough to contain 40 devices.

Unlike in the previous embodiment, once the blurred area is defined, the center of the non-public zone is not used as the modified location. In this embodiment, a point within the circular zone is randomly selected as the modified coordinates. This randomly selected point is identified as the blurred location, and the user is informed of the blurring range by noting the radius of the circle.

There, however, remains a problem to be solved in the above. If the user is in a non-public place, the user does not move much during the sample period, and if the system reports his or her location at each time as being within 0.5 miles of his or her actual location, then a "cloud" of false location readings are recorded for that person, with the "cloud" being centered around the unchanging location. Thus, if a third party looking at that cloud assumed that the person simply did not move, then this cloud could be used to identify the user's actual location with more precision than is guaranteed to the user (in terms of privacy). Thus, it is necessary not to provide multiple location readings for a user who does not move. In order to determine if the user has moved (keeping in mind that coordinates for non-public locations are blurred), each new location reading follows the steps of:

1) Determining if the device is in a public place; if the device is in a public location then the method remains unchanged (i.e., the actual location is recorded); if the device is not in a public location, then it is determined if the previously recorded location was public;

2) if the previous location was public, then the current location is blurred using the density map method;

3) if the previous location was non-public, then it is determined if the location immediately prior was also non-public. This reverse-time analysis is repeated until a public location is found or, if no public location is found, then until the first non-public (i.e., blurred) location is identified. This first location is identified as the "base" location;

4) determine if the base is a public location;

5) if the base is public, then the present location is the first non-public location. Thus, the original density map procedure is followed (i.e., providing coordinates randomly picked within some range.) If the base is non-public, then that location will be recorded as a location with a range;

6) determine if the current location is within the range of base location;

7) if the current location is within the range of the base (i.e. it might be the same as base) then record this location without modifying the coordinates. These coordinates may be recorded as, for example, "current location is within blurring range of last known nonpublic location"; and 8) if the current location is not within range of the base location, then apply the standard density model to that location, giving a random location within a range plus the size of the range.

In the above embodiments, the location may be given as coordinates or, alternatively, as a set of coordinates plus an uncertainty range.

It is to be understood that the present invention is not limited to the embodiments described above, but encompasses any and all embodiments within the scope of the following claims.

I claim:

1. A method of providing location-based information from anonymous portable devices, comprising the steps of:
    determining a geographic location of at least one anonymous portable device;
    recording geographic location coordinates of the at least one anonymous portable device in computer readable memory; and
    establishing and maintaining a set of preexisting, community recognized public geographic regions and a set of preexisting, community recognized non-public geographic regions within a geographic area in which the at least one anonymous portable device is located, wherein if the at least one anonymous portable device is located within the preexisting, community recognized non-public geographic region, the geographic location coordinates associated with the at least one anonymous are automatically replaced with a generalized set of geographic coordinates associated with the preexisting, community recognized non-public geographical region, and if the at least one anonymous portable device is located with the preexisting, community recognized public geographic region, the geographic location coordinates associated with the at least one anonymous portable device remain unchanged.

2. The method of providing location-based information from portable devices as recited in claim 1, further comprising the step of dividing each non-public geographic region into a plurality of geographic non-public zones.

3. The method of providing location-based information from portable devices as recited in claim 2, wherein the replacement of the geographic location coordinates associated with the at least one portable device with the generalized set of geographic coordinates associated with the non-public geographical region includes replacing the geographic location coordinates associated with the at least one portable device with location coordinates of the geographic non-public zone in which the at least one portable device is located.

4. The method of providing location-based information from portable devices as recited in claim 3, wherein the replacement of the geographic location coordinates associated with the at least one portable device with the generalized set of geographic coordinates associated with the non-public geographical region further includes replacing the geographic location coordinates associated with the at least one portable device with location coordinates of a centroid of the geographic non-public zone in which the at least one portable device is located.

5. The method of providing location-based information from portable devices as recited in claim 3, further comprising the step of establishing at least one density map for the geographic area, wherein the replacement of the geographic location coordinates associated with the at least one portable device with the generalized set of geographic coordinates associated with the non-public geographical region further includes replacing the geographic location coordinates associated with the at least one portable device with location coordinates based upon population density within geographic non-public zone.

6. The method of providing location-based information from portable devices as recited in claim 1, further comprising the step of recording time-based data associated with each set of geographic location coordinates which are recorded in the computer readable memory.

7. The method of providing location-based information from portable devices as recited in claim 6, further comprising the step of establishing a user-selectable time interval for determining the geographic location coordinates of the at least one portable device, and recording a set of geographic location coordinates and time-based data for each time interval.

8. The method of providing location-based information from portable devices as recited in claim 7, further comprising the step of plotting at least one set of geographic location coordinates on a graphical representation of the geographic area.

9. The method of providing location-based information from portable devices as recited in claim 8, further comprising the step of plotting a time-based geographic path of the at least one portable device on the graphical representation of the geographic area.

10. The method of providing location-based information from portable devices as recited in claim 1, further comprising the step of establishing a user-selectable level of non-public associated with the at least one portable device.

11. A method of providing location-based information from portable devices, comprising the steps of:
    determining a geographic location of at least one portable device;
    recording geographic location coordinates of the at least one portable device in computer readable memory;
    establishing a set of public geographic regions and a set of non-public geographic regions within a geographic area in which the at least one portable device is located;
    dividing each non-public geographic region into a plurality of geographic non-public zones, wherein if the at least one portable device is located within a non-public geographic region, the geographic location coordinates associated with the at least one portable device are replaced with a generalized set of geographic coordinates associated with the non-public geographical region, and if the at least one portable device is located within a public geographic region, the geographic location coordinates associated with the at least one portable device remain unchanged, the replacement of the geographic location coordinates associated with the at least one portable device with the generalized set of geographic coordinates associated with the non-public geographical region includes replacing the geographic location coordinates associated with the at least one portable device with location coordinates of the geographic non-public zone in which the at least one portable device is located, wherein the location coordinates comprise a centroid of the geographic non-public zone in which the at least one portable device is located;

recording time-based data associated with each set of geographic location coordinates which are recorded in the computer readable memory; and establishing a user-selectable time interval for determining the geographic location coordinates of the at least one portable device, and recording a set of geographic location coordinates and time-based data for each time interval.

12. The method of providing location-based information from portable devices as recited in claim 11, further comprising the step of plotting at least one set of geographic location coordinates on a graphical representation of the geographic area.

13. The method of providing location-based information from portable devices as recited in claim 12, further comprising the step of plotting a time-based geographic path of the at least one portable device on the graphical representation of the geographic area.

14. The method of providing location-based information from portable devices as recited in claim 13, further comprising the step of establishing a user-selectable level of privacy associated with the at least one portable device.

15. The method of providing location-based information from portable devices as recited in claim 14, further comprising the step of selectively replacing the geographic location coordinates associated with the at least one portable device with a generalized set of anonymous geographic coordinates.

16. The method of providing location-based information from portable devices as recited in claim 15, further comprising the step of recording a plurality of virtual geographic maps associated with the geographic area within the computer readable memory.

17. The method of providing location-based information from portable devices as recited in claim 16, further comprising the step of sampling the geographic location of the at least one portable device over a predetermined time interval, said predetermined time interval being selected as a portion of day.

* * * * *